United States Patent [19]
Graham et al.

[11] Patent Number: 6,111,329
[45] Date of Patent: Aug. 29, 2000

[54] ARMATURE FOR AN ELECTROMOTIVE DEVICE

[76] Inventors: Gregory S. Graham, 3282 Hilltop Dr., Ventura, Calif. 93003; Gerald W. Yankie, 1169 Harbor Hills Dr., Santa Barbara, Calif. 93109

[21] Appl. No.: 09/280,758

[22] Filed: Mar. 29, 1999

[51] Int. Cl.[7] .......................... H02K 15/00; H02K 15/02; H02K 15/04; H02K 1/22
[52] U.S. Cl. ...................... 310/42; 310/264; 310/DIG. 6; 29/598
[58] Field of Search ............................... 310/42, 40 MM, 310/261, 264, DIG. 6; 29/598, 602.1, 605, 829, 831

[56] References Cited

U.S. PATENT DOCUMENTS

| | | |
|---|---|---|
| 1,631,186 | 6/1927 | Apple . |
| 1,789,129 | 1/1931 | Apple . |
| 3,209,187 | 9/1965 | Angele . |
| 3,312,846 | 4/1967 | Henry-Baudot ........................ 310/266 |
| 3,441,761 | 4/1969 | Painton ................... 310/154 |
| 3,609,431 | 9/1971 | Lifschitz ................. 310/266 |
| 3,623,220 | 11/1971 | Chase ....................... 29/258 |
| 3,650,021 | 3/1972 | Karol ........................ 29/598 |
| 3,698,079 | 10/1972 | Lifschitz ................... 29/598 |
| 3,726,004 | 4/1973 | Holland et al. ........................ 29/602.1 |
| 3,763,551 | 10/1973 | Herron ....................... 29/598 |
| 3,805,104 | 4/1974 | Margrain et al. ...................... 310/266 |
| 3,944,857 | 3/1976 | Faulhaber ................. 310/266 |
| 4,019,075 | 4/1977 | Kagami ................... 310/206 |
| 4,123,679 | 10/1978 | Miyasaka ................................. 310/266 |
| 4,271,370 | 6/1981 | DiMeo .................... 310/266 |
| 5,270,602 | 12/1993 | Takehara ................. 310/198 |
| 5,714,828 | 2/1998 | Ackermann et al. ................... 310/254 |

*Primary Examiner*—Clayton LaBalle
*Attorney, Agent, or Firm*—Christie, Parker & Hale, LLP

[57] ABSTRACT

An armature for an electric motor is constructed from a pair of precision machined copper plates cut in a pattern to produce a series of axially extending surface conductive bands with each band separated from the other by an insulated cutout. The precision machined plates are rolled to form two telescoping, hollow cylinders with each cylinder having a pattern of conductive bands representing a half-electric circuit. The outer surface of the inner cylinder is wrapped with several layers of fiberglass strands for structural stability and insulation. The fiberglass wrapped inner cylinder is telescoped inside the outer cylinder. The outer surface of the telescoped structure is also wrapped with several layers of fiberglass strands for structural stability. The conductive bands from the outer cylinder being the near mirror image of the conductive bands of the inner cylinder are helically coupled to form a complete electrical circuit. The resulting tubular structure is encapsulated in a potting material for further structural stability and insulation. The result is a freestanding ironless core inductive armature coil for a DC motor with brushes. The armature also has a commutator, which is mounted at one end of the coil and is in electrical contact with the helically coupled conductive bands. An insulated flywheel and shaft assembly is mounted inside the coil with the flywheel behind the commutator for motor mounting and operation.

2 Claims, 4 Drawing Sheets

CURRENT ELEMENT
FIG 10a
PRIOR ART

CURRENT ELEMENT
FIG 10b
PRIOR ART

CURRENT LOOP
FIG 10c
PRIOR ART

ARMATURE FOR AN ELECTROMOTIVE DEVICE

BACKGROUND OF THE INVENTION

1. Field of the Invention

The present invention relates to electromotive devices and more particularly to an ironless core armature for an electric motor.

2. Description of the Prior Art

Electric motor manufacturers and in particular DC motor manufacturers have traditionally employed wire winding or printed circuit coil techniques to fabricate ironless core armatures, which move in a magnetic flux air gap. There, however, are a number of problems associated with these designs. Ironless core motors are typically run with a larger gap than conventional iron core designs. The iron core motors have wire wound through a core of magnetically permeable material and the iron core is cut to minimize the gap but iron core motors have more mass in the armature than ironless core motors creating undesirable inertia problems and involves unnecessary losses in the permeable material.

In the wire winding case, the insulated wire is wrapped in a multilayer configuration to form the current carrying coil with a specific conductor to insulation volume ratio know as packing density. With typical circular coil wire, the insulation material and air voids inherent in this coil construction make for a less than optimal conductor packing density. If square or rectangular conductors are used for armature winding, the packing density of the coil would be increased as well as the total volume of conductor within the magnetic gap. Coil wire is usually circular wire which consists of an electrical conductor (copper or aluminum) surrounded by an insulation layer on top of which there is a bonding layer for structural stability. In most prior art, armature wire windings of this type, the conductor packing factor is about 60%. If square wire were used in traditional armature production instead of circular wire, the conductor-packing factor could increase to 70%–80%. Manufacturers, however, prefer using circular wire due to its lower material and labor cost and ease of manufacturing. Therefore, a need exists for a new armature design that is cost effective to produce and that would result in a higher conductor-packing factor as well as higher volume of conductor in the magnetic gap. Some ironless core armatures are wire wrapped in angular fashion allowing conductor to conductor bonding for ease of manufacturing and structural integrity which is less efficient because electron flow should be at 90 degrees to the magnetic flux path for maximum efficiency. Angular wrapped armatures exhibit reduced torque by the sine of the angle of the current to the magnetic field. The structure of wire wrapped armatures makes it difficult to produce long small diameter armatures with adequate strength where high RPM produces destructive centrifugal forces.

Armatures built by Printed Circuit Board manufacturing techniques involve rotor windings being formed as flexible printed circuits. Printed circuits are circuits in which the conducting material is applied to an insulated support base by adhesives and etched from one side. The amount of electrical conductor in this case is compromised, however, as multiple layers of insulated printed circuit traces tend to result in a thicker armature wall and a diminished conductor packing factor. The packing density of this type of armature is lowered due to the volume of flexible printed circuit insulation material used to support the conductive loops during fabrication. Reducing the armature wall thickness with thin wraps of printed circuit traces tends to weaken armature walls and yield higher electrical resistance due to narrower and thinner conductor traces. Higher electrical resistance results in an undesirable increase in motor heat and energy dissipation, thus causing power losses equal to $P=I^2R$. Alternatively, wider printed circuit traces improve motor performance by reducing trace electrical resistance, but allow eddy currents, which reduce the overall gain by again increasing the effective electrical resistance. Printed circuit board (PCB) construction can be found in large gap motors where multiple layers are used to create multiple turn coils, to increase the length of conductor in the magnetic field. This results in a thicker armature structure and a larger magnetic gap. These flexible circuits are mostly used in brushless motor applications where the windings are held stationary and the magnet is rotated. The larger number of windings creates an armature of larger inductance and higher electrical resistance.

Various attempts have been made in the prior art to improve ironless core armature performance. For example, U.S. Pat. No. 3,944,857 to Faulhaber discloses an air-core or ironless core armature for electrodynamic machines having an elongated insulating strip rolled up to form a spiral structure composed of a number of radially successive layers. An armature winding is comprised of at least one armature coil and each coil is comprised of a number of electrically interconnected component coils. Each coil is formed of electrically interconnected conductor sections printed on both sides of the insulating strip. This PCB construction, unfortunately, does not optimize the configuration of the windings so as to produce optimal torque.

U.S. Pat. No. 3,805,104 to Margrain is directed to a hollow insulating cylinder with conductors which are placed over an internal metallic tubular support which is supported by an end disk at one end, and open at the other end, the open end being flared for stiffness. The cylinder has insulation with the electrical conductors being in printed or laminated circuit form. This type device, however, compromises the conductor-packing factor and does not produce optimal torque.

Figures 10A, 10B:
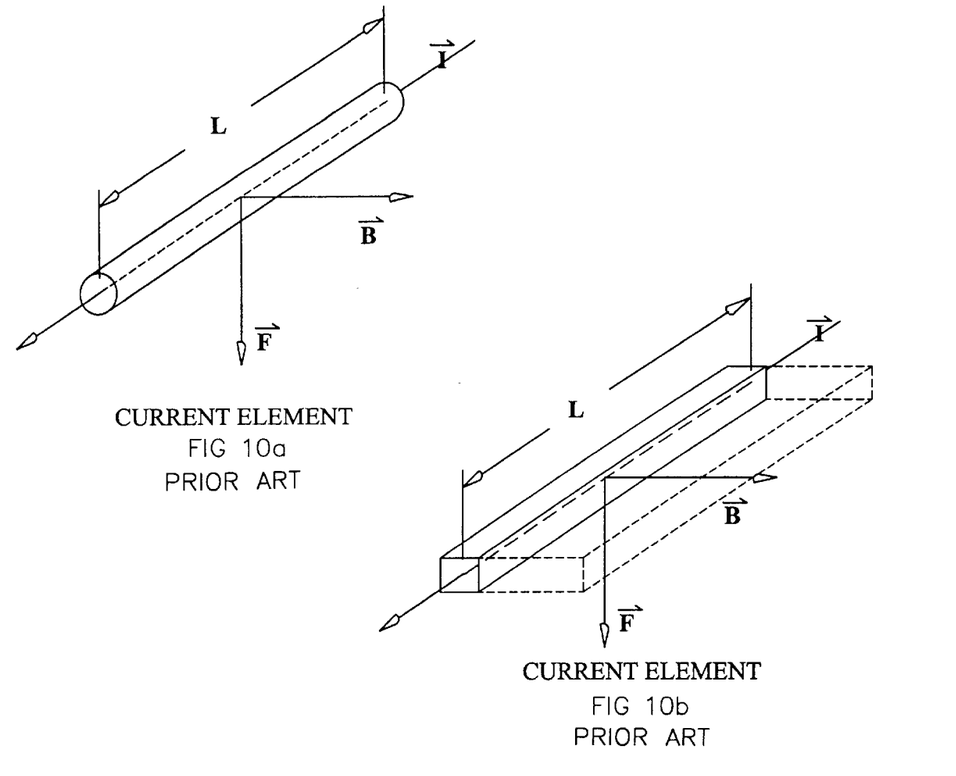
FIG. 10a is a graphic theoritical explanation of the Lorentz Force in a conventional wire wound armature.
FIG. 10b is a graphic theoritical explanation of the Lorentz Force in the invention disclosed herein.
Figure 10C:
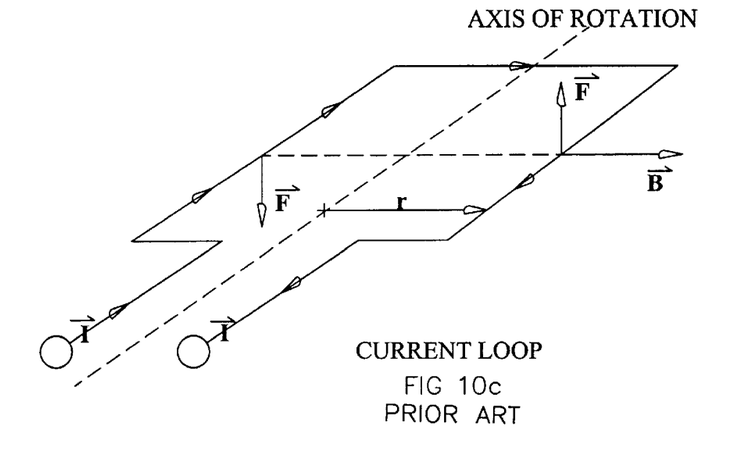
FIG. 10c graphically illustrates the application of the Lorentz Force in a typical electric motor armature.

The Lorentz Law for Electromotive Devices is $F=I \times L \times B$; where F=Force, I=current, L=conductor length, B=magnetic flux density. The Lorentz Law theory as it applies to electric motors is clearly illustrated in FIGS. 10a, b and c. FIG. 10a illustrates the environment we see in traditional wire wound armatures in use today. Wire wound conductors of necessity must have wire insulation which decreases the carrier packing factor and thereby the current density per unit area, and thereby the inability to uniformly mount the armature in such manner to cut a maximum of flux lines. In addition, wire wound armatures typically are wound at an angle thereby creating a angle between the crossed vectors of Current and Magnetic Flux that is less than the maximum desired of ninety degrees to yield the greatest force. FIG. 10b illustrates the metal strip carriers envisioned by the invention disclosed herein. It can be observed that a square cross section of FIG. 10b will enable a greater proximity of the flat sided current carrier to the means from which the magnetic flux emanates/terminates in the gap between current flow/conductor and said means where the greatest flux density exists. The round cross section of a conventional wire wound armature does not permit such close proximity of current carrier and magnetic field carrier. In addition, the square cross section of the invention disclosed herein can be increased to a rectangular cross section as indicated in FIG. 10b to yield an even greater current density and flow in a very much reduced magnetic flux gap where the flux density is at its greatest. Incorporating the complete current loop illustrated in FIG. 10c, it becomes very apparent that the doubled Lorentz Force resulting from the same force on each arm of the conductor and imposed on the flat conductor surface of FIG. 10b will be substantially increased by the increased current density, increased flux density and a maximum ninety degree angle between current and flux. The substantial factor that increases the Lorentz Force in the invention herein is that the wire wound armatures of conventional art are typically disposed at an angle to the Magnetic Flux Density; therefor, the Current (I) vector/flow is at an angle to the Magnetic Flux (B) vector which of necessity yields a smaller resulting Lorentz Force (F). The vector diagrams of FIGS. 10a, b and c clearly illustrate that the force (therefore torque) on an armature of the type described above can be increased by optimizing or increasing each of the terms of the equation. In particular, current (I) flow may be maximized by reducing the electrical resistance of the conductor coil. In a specific armature design, conductor length (L) increases can be obtained from multiple conductor loops. Magnetic flux density (B) can be maximized by minimizing the air gap between the magnetic return structure and magnet wherein the armature rotates, that is, the closer the magnetic return path is to the magnet, the higher the magnitude of the magnetic flux density (B) will be. For any given current in the windings of the armature, which is placed in the higher magnetic field, torque will be increased. Therefore, to improve efficiency of the traditional motor, an armature manufacturer or designer should strive to reduce the armature wall thickness which would result in the ability to reduce the size of the magnetic gap creating higher flux density, this should be accomplished without sacrificing conductor length or increasing conductor resistance. Positioning the armature walls, magnetic means and flux return path means, in close proximity to the magnetic field origin and return path will allow for more conductor volume for a given gap width, less electrical resistance and increasing the conductor density within the gap.

SUMMARY OF THE INVENTION

The present invention is directed to an ironless core armature for a D.C. motor with brushes. The armature has a conductive coil constructed from a pair of precision-machined rectangular metal sheets or plates, copper or copper alloy, cut in a pattern to produce a series of generally parallel conductive bands with each band separated from the other by a cutout. Each cut plate is rolled to form a hollow open-ended cylinder with the orientation of conductive bands on one cylinder being a near mirror image of the other so that the conductive band pattern on one cylinder represents a half electrical circuit with the other half circuit represented by the conductive band pattern of the other cylinder. One cylinder, also called the inner cylinder, has a slightly smaller diameter than the other so as to fit inside the larger diameter cylinder (also called the outer cylinder). The outer surface of the inner cylinder is tightly wrapped with sufficient layers of threadlike fiberglass strands or other non-conductive filaments, which provides insulation and structural stability. The sheet stock has structural temper, whereas printed circuit board armature construction utilizes annealed or soft copper materials, and contributes to the overall strength of the armature structure. The fiberglass strand covered inner cylinder is telescopically inserted into the outer cylinder by concentrically and axially aligning the end points of the conductive bands of each cylinder on both sides. The outer surface of the telescoped tubular structure is also tightly wrapped with several layers of fiberglass strands for structural stability. The outer and inner cylinder conductive bands are then soldered, or otherwise electrically attached, at their respective connection points to form a continuous, helical conductive coil. When subsequently fixed with encapsulation material, the end result is a thin-walled, tubular, freestanding conductive coil. The plates when rolled and assembled as described above exhibit structural integrity that creates a rigid armature structure. This enables much higher rotational speeds than conventional construction of ironless core motors.

In the preferred embodiment of the present invention, the free-standing conductive coil is provided with a disc-shaped commutator, having a series of conductive radial segments which mount to one end of the coil, collect current from the motor brushes and distribute the current to the inductive coil. The coil is further provided with an insulated disc-shaped flywheel mounted inside the coil behind the commutator before the commutator is mounted. The flywheel has a diameter designed to fit snugly inside the inner cylinder so that the flywheel is held in contact with the electrical conductors, providing torque translation to the output shaft. The armature also has a metal shaft axially inserted inside the coil from the center of the flywheel and the center of the commutator with a portion of the shaft extending out on each end of the coil. The shaft is frictionally held in position by the flywheel. The thus assembled armature can be mounted via its shaft in any D.C. motor having brushes with the coil rotating on its shaft in a thin magnetic flux air gap during operation.

These and other embodiments, features, and advantages of the present invention will become more apparent from a review of the accompanying drawing and the following detailed description of an enabling embodiment and a preferred, best-mode embodiment.

OBJECTS OF THE INVENTION

It is an object of the invention to provide an ironless core armature for a D.C. motor that would maximize the conductor-packing factor and the conductor volume to gap ratio.

It is an object of the invention to provide an ironless core armature for a D.C. motor that would maximize the magnetic flux density in the thin air gap between the magnetic return media and magnet in which the armature rotates.

It is an object of the invention to provide an ironless core armature for a D.C. motor that would reduce the air gap between the magnetic return media and magnet.

It is an object of the invention to provide an ironless core armature for a D.C. motor with a reduced armature wall thickness.

It is an object of the invention to provide an ironless core armature for a D.C. motor that can withstand high temperatures and moist environments such as autoclaves for prolonged period of time and multiple exposures.

It is an object of the invention to provide an ironless core armature that has more power and torque than known ironless core armatures of similar size.

These and other objects of the present invention will become still more apparent from a review of the accompanying drawing and the following detailed description of the several figures thereof.

DETAILED DESCRIPTION OF A PREFERRED EMBODIMENT

The following description discloses an enabeling embodiment of the invention and includes the best mode presently contemplated for carrying out the invention. This description is not to be taken in a limiting sense, but is made merely for the purpose of describing the general principles of the invention. Various modifications and variations may be made in the present invention without departing from the scope or spirit of the invention. Features illustrated or described as part of one embodiment can be used in another embodiment to provide yet another embodiment. Thus, it is intended that the present invention covers such modifications and variations as long as they come within the scope of the appended claims and their equivalents.

Figure 1A:
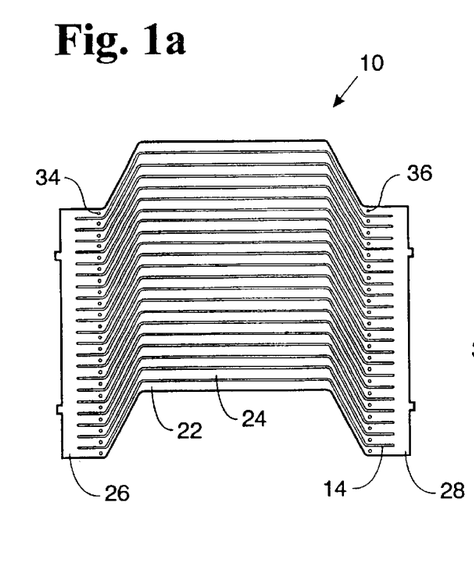
FIGS. 1a and 1b is a plan view of a pair of copper sheets, precision cut in accordance with the present invention.
Figure 1B:
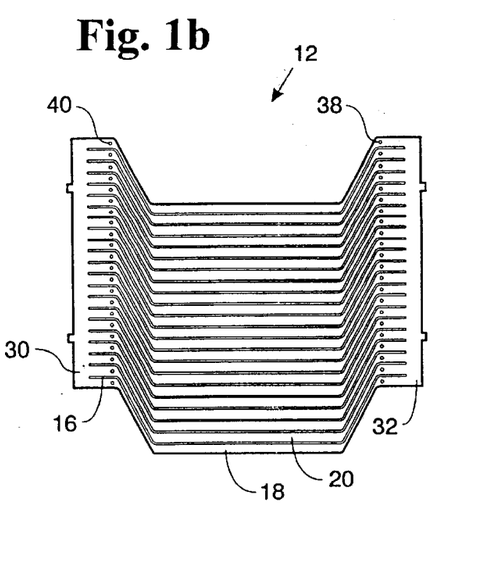

The present invention relates to an ironless core armature for a DC motor having brushes. The novel armature has a conductive coil constructed from a thin pair of nearly mirror image, electrically conductive and precision-machined pieces of bare sheet metal such as sheets or plates 10 and 12 shown in FIGS. 1a and 1b, respectively. Plates 10 and 12 are preferably made of tempered copper grade 110 with each plate precision cut in a pattern to produce a series of generally parallel conductive bands, 18 and 22, with each band being separated from the other by an elongated cutout such as cutout 14 of plate 10 and cutout 16 of plate 12 as shown in FIG. 1a and 1b. The cutouts are identical and subsequently electrically insulated to prevent electrical contact between neighboring bands such as bands 18 and 20 of plate 12 and bands 22 and 24 of plate 10. The preferred width of a cutout is about 1–1.5 times the conductor thickness, which in the preferred embodiment would be copper (Cu). The preferred cutout width tends to optimize the current flow and the number of conductive bands that can be precision machined on a copper plate. Each copper plate is preferably 2 inch by 3 inch (apx 5 cm×7.5 cm) and has a thickness of about 0.005 inch (0.12 mm). Other dimensions and materials may be used to manufacture conductive plates 10 and 12 provided that such materials and dimensions are consistent with the intended purpose of the present invention. The desired pattern is achieved by precision cutting the plates by chemical machining to create the pattern of FIGS. 1a and 1b. The desired pattern can be machined by alternate techniques such as water jet cutting, laser cutting, electron beam cutting, fine blanking or conventional machining methods. Each plate has a carrier strip on each edge such as carrier strips 26 and 28 of plate 10 and carrier strips 30 and 32 of plate 12. The carrier strips support the conductive bands at each end and are subsequently removed as explained herein below. The inventive pattern also includes a series of relatively small holes such as holes 34 and 36 of plate 10 and holes 38 and 40 of plate 12, one on each end of a conductive band. The preferred diameter of each hole is about 0.25 mm. The preferred total number of holes on each side is equal to the number of conductive bands. The total number of holes matches on each side equal the total number of conductive bands on each plate. It will be appreciated that armature coils of this type may be constructed from plates having less or more conductive bands/holes depending on various DC motor operational requirements.

Figure 2:
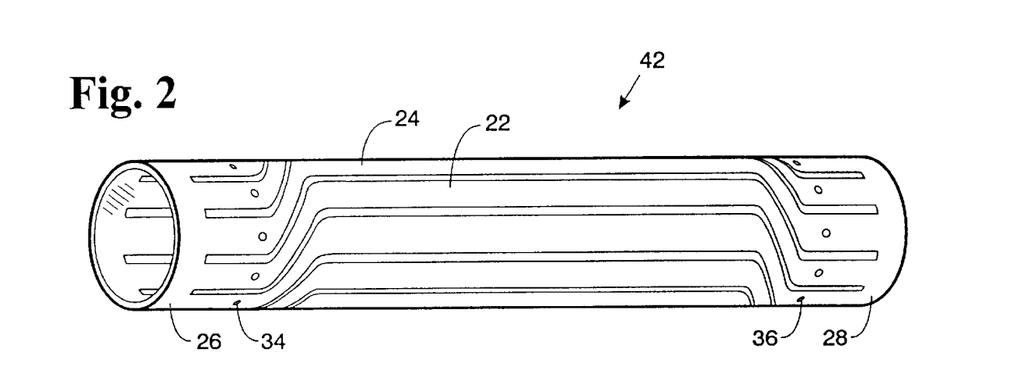
FIG. 2 is an elevational perspective view of the plates/sheets of FIG. 1a rolled into a hollow cylinder in accordance with the present invention.
Figure 3:
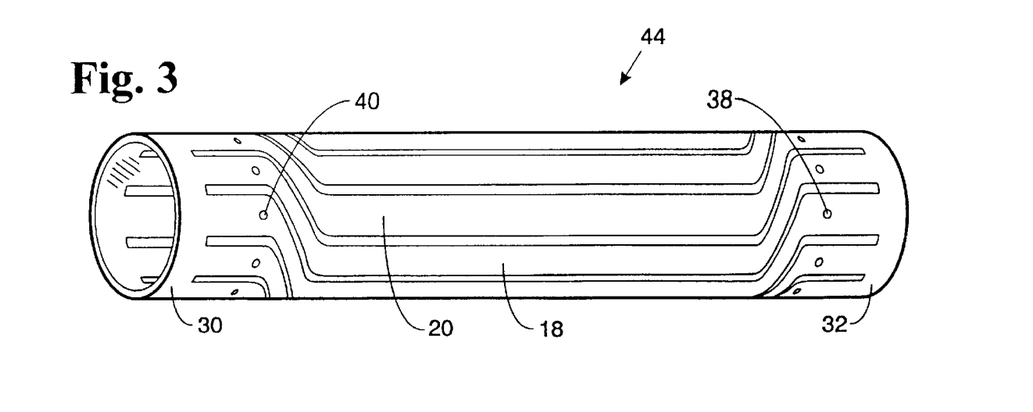
FIG. 3 is an elevational perspective view of the plate of FIG. 1b rolled into a hollow cylinder being the near mirror image of the cylinder of FIG. 2 in accordance with the present invention.

Plate 10 is rolled into a thin-walled hollow cylindrical shape such as cylinder 42, of FIG. 2. Plate 12 is also rolled into a thin-walled hollow cylindrical shape such as cylinder 44, of FIG. 3, but with its pattern of conductive bands and cutouts specifically oriented to create a near mirror image of the pattern of conductive bands and cutouts of plate 10. The preferred diameter of cylinder 42 is about 0.510 inch (apx 2 cm) and the preferred diameter of cylinder 44 is about 0.520 inch (apx 2 cm). Cylinder 42 is formed with a slightly smaller diameter to allow subsequent telescoping of the same into cylinder 44 to form a novel conductive coil. For this reason, cylinder 44 will hereafter be referred to as outer cylinder 44 and cylinder 42 will respectively be referred to as inner cylinder 42. Other size cylinder diameters may be utilized provided that they do not deviate from the intended purpose of the present invention.

Figure 4:
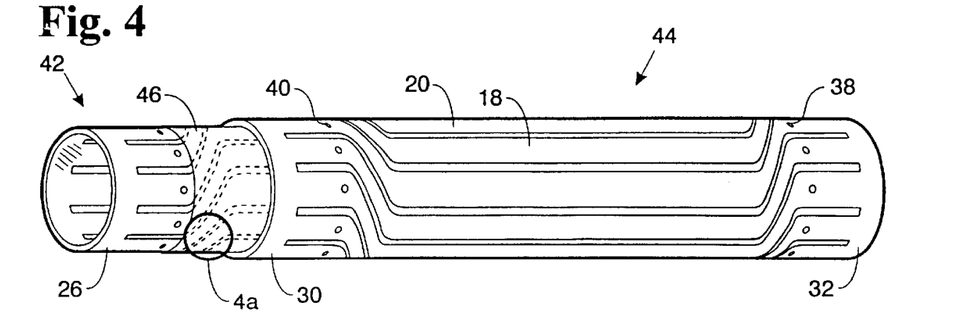
FIG. 4 is an elevational perspective view of the cylinder of FIG. 2 being inserted into the cylinder of FIG. 3 to form a tubular conductive coil in accordance with the present invention.
Figure 4A:
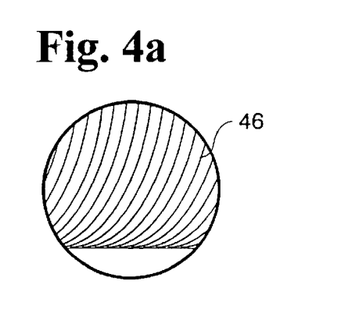
FIG. 4a is a blow up of a portion of FIG. 4 illustrating detail of the wound insulation layer.

Next, inner cylinder 42 is placed on a mandrel and four to five layers of fine industrial grade fiberglass strands such as thread 46, shown in FIG. 4, preferably having a thickness of about 0.00015 inch, are automatically tightly wrapped over the entire outer surface where insulation is required while at the same time avoiding the interconnect areas of inner cylinder 42. The main purpose for tightly wrapping multiple layers of fiberglass strands over outer surface of inner cylinder 42 is to provide structural support for the tubular structure. The fiberglass layers also provide a certain degree of electrical insulation between inner cylinder 42 and outer cylindar 44. The preferred thickness of the fiberglass layers is estimated at about 0.00075 inch and is therefore relatively small but adds significant strength. The fiberglass-wrapped inner cylinder 42 is then inserted all the way into outer cylinder 44 (i.e. inner cylinder 42 and outer cylinder 44 are of equal length) with the insertion carried out so as to ensure concentric and axial alignment of both cylinders and matching of respective holes on each side of inner cylinder 42 with the corresponding holes on each side of outer cylinder 44 (FIG. 4). The next step is to tightly wrap four to five layers of industrial grade fiberglass strands over the outer surface of outer cylinder 44 in the same way as was done with inner cylinder 42. This fiberglass layer is primarily needed for structural support. The preferred thickness of the outer cylinder fiberglass layers is estimated at about 0.00075 inch. The electrical insulation and armature structural strength required depends on the application of the DC motor being produced. The 0.00075 inch material thickness along with the subsequent encapsulation material is sufficiently strong to withstand the centrifugal forces of rotational speeds in excess of 30,000 RPM.

The matched holes are then utilized to provide solder flow paths to interconnect pads of each coil segment using, preferably, a lead-silver-tin solder material which can withstand operational temperatures as high as 450 degrees Fahrenheit (F.°). This interconnect can be welded instead of soldered to create an interconnect with copper as the base weld material to allow even higher armature temperatures. A DC motor with the inventive armature coil may tolerate higher operational current and thus higher operational temperature due to the high temperature capability of solder material used. Alternative methods of joining the matched holes may be used, such as crimping, spot welding or laser welding. If welding is used, the armature operational temperature rises to about 650 degrees F.°, which is the utilization temperature of the current embodiment of the encapsulation material. The matched solder holes (See FIGS. 1a and 1b) e.g. 34,36, and 40, 38, respectively, are not required if solder is not the selected bonding material.

Figure 5:
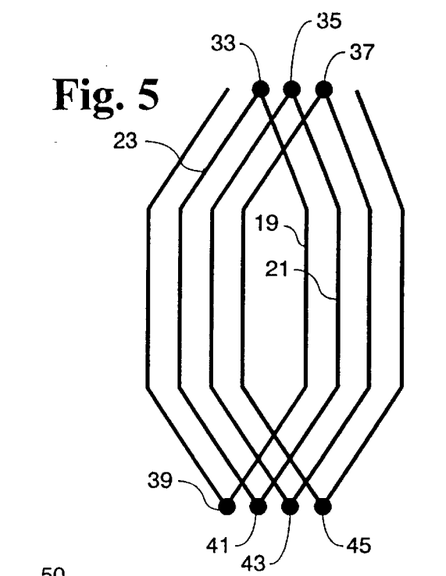
FIG. 5 is a graphic illustration of the interconnection of conductive loops to form a continuous tubular conductive coil in accordance with the present invention.

The soldered joints electrically interconnect all outer cylinder 44 conductive bands with respective inner cylinder 42 conductive bands so as to form a continuous, inductive helical structure as shown in FIG. 5. FIG. 5 illustrates in detail how a portion of the helical structure is accomplished. For example, inner cylinder 42 conductive band 23 is electrically connected at one end (hole 33) with outer cylinder 44 conductive band 19 and at the other end (hole 41) with outer cylinder conductive band 21. The rest of the inner cylinder 42 conductive bands are similarly interconnected with respective outer cylinder 44 conductive bands with the total number of interconnections at each end being the same. Essentially, the inner cylinder 42 conductive bands provide one half of the electric circuit and the outer cylinder 44 conductive bands provide the other half of the circuit. Joining the two halves completes the electric circuit. In comparison with a wire wound armature, the wire has a minimum bend radius at the cylinder ends that increase the armature wall thickness. Prior art armatures are therefor thicker at the ends whereas the armature in this invention is no thicker at the ends than anywhere else along the armature wall.

Figure 6:
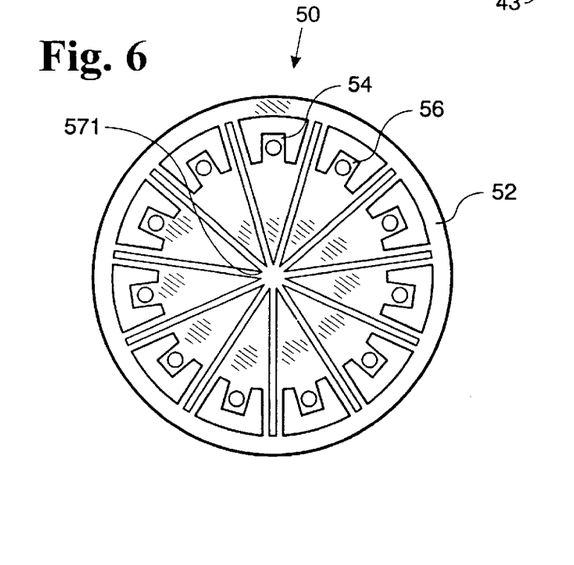
FIG. 6 is a plan view of a commutator in accordance with the present invention.

FIG. 6 depicts a commutator 50 which is constructed by precision machining a thin metal sheet plate, preferably tempered copper alloy like Beryllium/Copper, in the pattern shown. Commutator 50 has a carrier ring 52 which supports eleven segments such as segments 54, 56, etc. The commutator segments are soldered to matching solder points on the outside of outer cylinder 44. Commutator 50 collects current from the DC motor brushes and provides power (or distributes current) to the helical coil circuit of the telescoped cylinder assembly via its current conducting segments. The eleven tabs at opening 571 and the eleven segments 54,56, etc., are bent at 90 degree to the commutating surface using a cold forming tool. This step prepares the commutator ring for solder attachment to the completed armature coil 62 of FIG. 8. Before commutator mounting can be accomplished, carrier ring 30 from outer cylinder 44 (FIG. 3) and carrier ring 26 from inner cylinder 42 (FIG. 2) are removed by cold forming in preparation for attaching the commutator ring 50.

After soldering or welding the commutator ring 50 to the armature coil 48, the carrier ring 52 (FIG. 6) is removed from the commutator 50 by cold forming.

Figure 7:
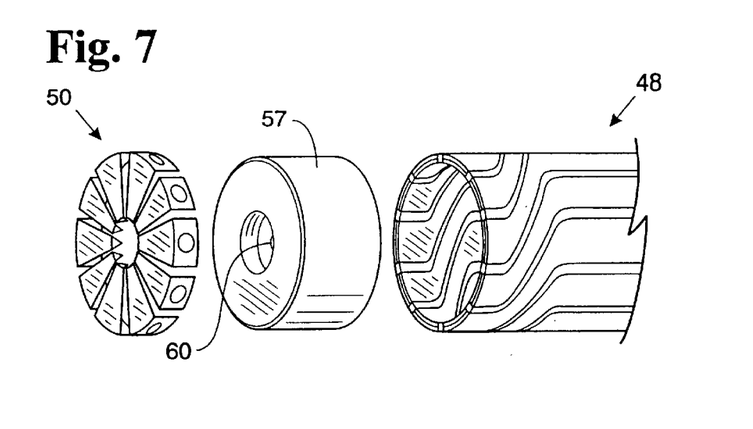
FIG. 7 is an exploded perspective view of an ironless core armature being assembled in accordance with the present invention.

FIG. 7 illustrates an ironless core armature being assembled from a coil 48 (which is the telescoped cylinder assembly described above), a commutator 50 and a disk-shaped flywheel 57. Flywheel 57 is provided with a circular central opening 60 for fitting a shaft 58 (FIG. 9) and is preferably made from high-strength aluminum. Flywheel 57 is anodized on its exterior surface to create a consistent insulation layer over the outer surface. Flywheel 57 is capable of current and voltage isolation via a non-conductive anodized coating and yet has high thermal mass and stiffness to transmit torque and securely fix shaft 58 shown in FIG. 9. The diameter of flywheel 57 is slightly smaller than the diameter of the inner cylinder 42 to allow snug fit of the flywheel inside inner cylinder 42 when the flywheel is subsequently pressed into one end of inner cylinder 42. Other materials such as ceramic, high-strength glass and the like may be employed to manufacture the flywheel as long as said materials do not depart from the intended purpose of the present invention.

Again, the order of assembly of the novel armature is to first press-fit flywheel 57 into one of the open ends of coil 48 (FIG. 7). Then insert flywheel 57 which will be held inside inner cylinder 42 of coil 48 by friction alone. Next, the commutator 50 tabs are soldered (using the type of solder material as previously described) over the electrically joined interconnections of the telescoped cylinder assembly 48. In this case, since the total number of commutator segments is 11 and the total number of soldered holes is 22, one segment will service two solder holes (or electrical interconnections) on the telescoped cylinder assembly. This type of commutator construction allows for a relatively large number of segments to be utilized which results in a reduced number of coils at each switch of the commutator thus reducing commutator sparking.

Back emf follows from Faraday's Law, that is, when an electrically conducting loop is in motion in a magnetic field, a voltage is induced in the loop. In DC motors, the rotation of the armature winding (or coil) in the presence of a magnetic field results in an induced voltage in the armature coil. This voltage is called "back emf" and is undesirable during motor operation. The use of a relatively large number of commutator segments is an improvement over known commutators, which normally use 2–9 segments. It should be appreciated that the number of soldered points on the cylinder assembly in accordance with the preferred embodiment of the present invention is a multiple of the number of commutator segments. In this case, the total number of soldered holes, 22, is a multiple of (i.e. 2×11=22) the total number of commutator segments, 11. Other multiples may be produced as well in accordance with the present invention such as 3×, 4×, etc. Commutator 50 can also be made from a conductive material other than pure copper to resist mechanical abrasion at the brush/commutator interface and yet maintain high conductivity. The preferred technique is to utilize more than eleven segments on the commutator; however, more segments may be utilized for other circumstances.

The assembled shaftless armature is then subjected to encapsulation to provide additional structural stability, to permanently secure all components and to provide complete electrical insulation of the armature. Specifically, the shaftless armature is dipped into a polyimide solution which is preferably comprised of 25% solid/solute (polyimide) and 75% solvent (NMP). Polyimides are known for their high thermal resistance and are also non-flammable due to their aromatic, halogen-free structure that manifests itself in a very high limited oxygen index (about 38%). When subjected to flame, polyimide has a very low level of smoke formation and toxic gas formation, which makes it a preferred bonding agent for this armature. Polyimide is also chemically resistant to organic solvents such as alcohol, ketones, chlorinated hydrocarbons, and has low moisture absorption.

The dipped armature is then centrifuged to remove air and replace air voids with the polyimide solution. Centrifugal force pushes the air out of the structure and pushes the polyimide deeper into the crevices and cracks of the telescoped tubular structure allowing permanent bonding and insulation of the components.

The polyimide-dipped armature is preferably heat-cured at about 450° F. to remove solvents and to yield a hardened, cured polyimide encapsulation of the armature. The limitation to the curing temperature is the 550° F. solder flow temperature; however, using non-solder welding techniques allows polyimide curing at 700° F. and armature operating temperatures of 650° F. Other potting materials may be used such as ceramic, glass, silicates, silicones, etc. After the shaftless armature has been heat-cured, it is allowed to cool to room temperature. Upon inserting a shaft, the end product is a strong, stiff and fully insulated armature that can be used in any DC motor application having brushes for sliding electrical contact. It is worth noting that the cured shaftless armature has very low moisture absorption due to the composition of its components, namely, copper, high-quality soldering material, fiberglass and polyimide. This makes the novel armature an excellent choice for a DC motor for medical/dental use, as repeated heat sterilization or autoclave runs will not affect the operation of the armature. Furthermore, the limiting operational temperature of a DC motor equipped with the inventive armature is about 450° F. which is a considerable improvement over prior art DC motors which can operate at a limiting temperature of about 257° F.

Figure 8:
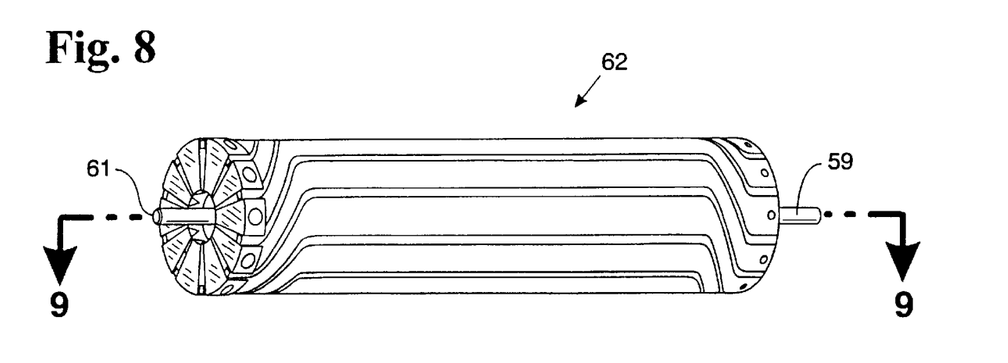
FIG. 8 is an elevational perspective view of an assembled ironless core armature with drive shaft inserted in accordance with the present invention.

FIG. 8 Illustrates a fully assembled freestanding ironless core armature 62 for a DC motor with brushes. Armature 62 includes an axially inserted shaft 58 with portions 59 and 61 sticking out each end for motor mounting. Before shaft 58 can be mounted, carrier rings 28 from inner cylinder 42 and carrier ring 32 from outer cylinder 44 (FIGS. 2&3, respectively) are cut off by cold forming. This removal of the carrier rings 28 and 32 completes the isolation of the individual helical segments thereby creating a continuous coil loop around the armature. Shaft 58 is preferably made from hardened stainless steel grade 17-4PH and is press-fit axially inside inner cylinder 42 passing through opening 60 of already mounted flywheel 57 and through opening 571 of already mounted commutator 50. The preferred dimensions of shaft 58 are ⅛" diameter×2½" long. Other materials and dimensions may be used to manufacture the shaft 58 if said materials do not depart from the intended purpose of the present invention.

Figure 9:
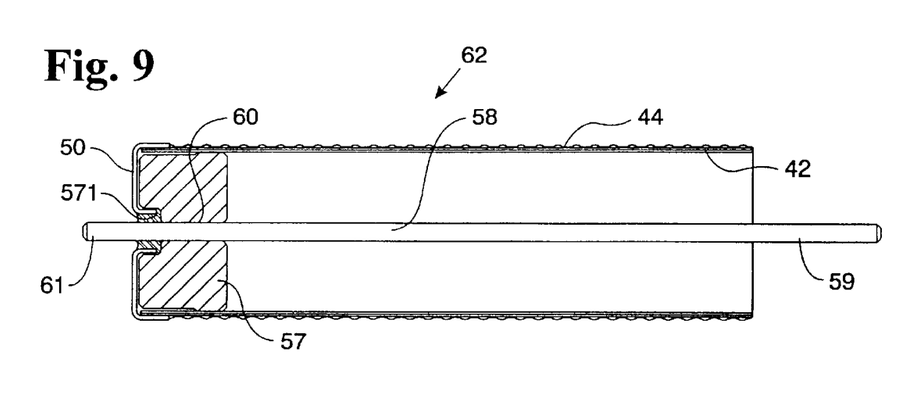
FIG. 9 is a cross-sectional view along section line 9—9 of FIG. 8.

FIG. 9 is a cross-sectional view of armature 62 showing the frictional connection of shaft 58 inside opening 60 being held in place by flywheel 57.

Due to the excellent penetration properties of the novel polyimide encapsulation material and the very thin coil wall of the inventive armature, the gap between magnetic media and magnet is minimized which optimizes the magnetic flux density in the thin air gap in which the rotor moves producing greater motor torque than known armatures of similar size. Performance variations due to assembly irregularities are also reduced to a minimum using the novel coil assembly process. The assembly variables are insignificant to the extent that the armature does not require dynamic balancing for operation below 20,000 RPM. Additionally the assembly precision allows the armature walls and gap walls to be positioned extremely close with spacing of 0.002/0.003 inch (0.05/0.07 mm) between moving and non-moving walls (gap and armature surfaces) utilized which increases the total conductor to gap packing factor. The materials used in the design of the novel armature all exhibit very high temperature resistance which results in a stable armature capable of operating under various high temperature conditions. Moreover, the inventive armature design is cost effective to manufacture.

It is conceived that the armature of the present invention can be used in a variety of applications such as drills (dental, medical, commercial), hobby craft, automotive, aerospace, photocopiers, printers, robotics, disc drives and motion control devices. For example, the above described armature can also be employed in brushless DC motors. In such applications, the armature of the brushless motor designs will have only the inventive freestanding, thin-walled, non-rotating helical inductive coil driving a magnet/shaft assembly, which would become the rotating element.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawing shall be interpreted as illustrative and not in a limiting sense.

While the present invention has been described in detail with regards to the preferred embodiments, it is appreciated that other variations of the present invention may be devised which do not depart from the inventive concept of the present invention. In particular, it is appreciated that the various teachings described in regards to the specific embodiments herein may be combined in a variety of ways such that the features are not limited to the specific embodiments described above.

It is to be understood that the following claims are intended to cover all of the generic and specific features of the invention herein described and all statements of the scope of the invention which, as a matter of language, might be said to fall there between.

What is claimed is:

1. A method of fabricating an inductive coil from a pair of conductive plates, comprising:

cutting each said plate in a pattern to produce a series of conductive bands and cutouts;

rolling said cut plates into telescoping inner and outer tubes;

wrapping said inner tube;

inserting said wrapped inner tube into said outer tube;

wrapping said outer tube; and coupling said conductive bands of said inner tube to said conductive bands of said outer tube to form a helical inductive coil.

2. A method of fabricating a thin-walled inductive coil assembly from a pair of conductive plates, comprising:

cutting each said plate in a pattern to produce a series of conductive bands and cutouts;

rolling said cut plates into telescoping inner and outer tubes;

wrapping said inner tube;

inserting said wrapped inner tube into said outer tube;

wrapping said outer tube;

coupling said conductive bands of said inner tube to said conductive bands of said outer tube to form a helical inductive coil;

assembling a flywheel and coupling said flywheel and a commutator to said coil to form a coil assembly;

dipping said coil assembly;

centrifuging said dipped coil assembly in a potting material;

heating said centrifuged coil assembly at approximately 450 degrees F. to cure said potting material; and cooling said heated coil assembly to room temperature.

* * * * *